United States Patent Office 3,510,500
Patented May 5, 1970

3,510,500
PROCESS FOR PREPARING AN ESTER FROM A MONOBASIC ORGANIC ACID AND AN ORGANIC HALIDE
William L. Walsh, Glenshaw, Pa., assignor to Gulf Research & Development Company, Pittsburgh, Pa., a corporation of Delaware
No Drawing. Filed Dec. 26, 1963, Ser. No. 333,624
Int. Cl. C07c 67/02, 69/76; C11c 3/10
U.S. Cl. 260—410.5                               23 Claims

ABSTRACT OF THE DISCLOSURE

A process for preparing an ester which comprises reacting a monobasic organic acid with an organic halide, preferably at a temperature of about 180° to about 400° C., and, in a preferred embodiment, in the presence of catalytic amounts of a compound composed of said organic acid wherein an acid hydrogen thereof is replaced by an element selected from the group consisting of lithium, magnesium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth.

This invention relates to a process for preparing an ester which comprises reacting a monobasic organic acid with an organic halide selected from the group consisting of primary straight and branched chain alkyl halides, secondary straight and branched chain alkyl halides, primary and secondary cyclic halides, straight and branched chain olefinic halides and aromatic halides. The esters obtained herein can be employed as solvents for paints, resins, etc.; as plasticizers for resins, rubbers; or they can be hydrolyzed with water to obtain the corresponding alcohols.

One of the reactants required in the process defined and claimed herein to obtain an ester is a monobasic organic acid. Dibasic organic acids cannot be made to produce esters under the reaction conditions defined herein. Among the monobasic organic acids that can be employed and are preferred in the practice of this invention are saturated straight chain aliphatic monobasic acids having from two to 30 carbon atoms, preferably from two to 22 carbon atoms, and saturated branched chain aliphatic monobasic acids having from two to 30 carbon atoms, preferably from two to 22 carbon atoms. Specific examples of such acids are: acetic, propionic, butyric, valeric, caproic, oenanthic, caprylic, pelargonic, capric, undecanoic, lauric, tridecanoic, myristic, pentadecanoic, palmitic, margaric, stearic, nonadecanoic, arachidic, heneicosanoic, behenic, tricosanoic, lignoceric, pentacosanoic, hexacosanoic, carboceric, octacosanoic, montanic, triacontanoic, isobutyric, isovaleric, pivalic, isocaproic, 2-methylbutanoic,
3-methylbutanoic,
2-methylpentanoic,
2-ethylbutanoic,
3-methylpentanoic,
2,2-dimethylbutanoic,
3.3-dimethylbutanoic,
2,3-dimethylbutanoic,
2-ethylhexanoic,
methylneopentylacetic,
2,2-dimethylpentanoic,
2,2-dimethylheptanoic,
2,2-dimethylhexanoic,
2,2-dimethyloctanoic,
2,2-dimethylpelargonic,
2,2-dimethyldecanoic,
2,2-dimethylundecanoic,
2,2-dimethyllauric,
2,2-dimethyltridecanoic,
2,2-dimethylmyristic,
2,2-dimethylpentadecanoic,
2,2-dimethylpalmitic,
2,2-dimethylmargaric,
2,2-dimethylstearic,
2,2-dimethylnonadecanoic,
2,2-dimethylarachidic,
2,2-dimethylheneicosanoic,
2,2-dimethyltricosanoic,
2,2-dimethylpentacosanoic,
2,2-dimethylcarboceric,
2,2-dimethylmontanic,
3.3-dimethylbutyric,
3,3-dimethylpentanoic,
3,3-dimethylhexanoic,
3-methyl-3-ethylpentanoic,
3,3,5,5-tetramethylhexanoic,
3-methyl-3-ethylheptanoic,
3-methyl-3-ethylpentanoic,
3-methyl-3-ethylpelargonic,
3-methyl-3-ethylundecanoic,
3-methyl-3-ethyltridecanoic,
3-methyl-3-ethylpentadecanoic,
3-methyl-3-ethylmargaric,
3-methyl-3-ethylnonadecanoic,
4,4-dimethylpentanoic,
4,4-dimethylhexanoic,
4,4-dimethylheptanoic,
4-methyl-4-ethylhexanoic,
4,4,6,6-tetramethylheptanoic,
4-methyl-4-ethyloctanoic,
4-methyl-4-ethylhexanoic,
4-methyl-4-ethyldecanoic,
4-methyl-4-ethyllauric,
4-methyl-4-ethylmyristic,
4-methyl-4-ethylpalmitic,
4-methyl-4-ethylstearic,
4-methyl-4-ethylarachidic,
dineopentylacetic,
methyl-t-butyleneopentylacetic, etc.

Aromatic monobasic organic acids such as benzoic acid, toluic acids, alpha-naphthoic acid, beta-napthoic acid, pyridine carboxylic acids, etc., and saturated cyclic monobasic acids, such as cyclohenanecarboxylic, cyclopropanecarboxylic, cyclobutanecarboxylic, cyclopentanecarboxylic, cycloheptanecarboxylic, cyclooctanecarboxylic, cyclononanecarboxylic, cyclodecanecarboxylic, cycloundecanecarboxylic, cyclododecanecarboxylic, cyclotridecanecarboxylic, cyclotetradecanecarboxylic, cyclopentadecanecarboxylic, cyclohexadecanecarboxylic, etc., can also be employed. Straight and branched monobasic olefinic acids having from three to 22 carbon atoms, preferably from six to 22 carbon atoms, can additionally be employed. Examples of such olefinic acids include acrylic, crotonic, isocrotonic, alpha-methylacrylic, vinylacetic, beta-ethylacrylic, beta, beta-dimethylacrylic, pentenoic, allylacetic, angelic, tiglic, hydrosorbic, isohydrosorbic, pyroterebic, teracrylic, heptenoic, octenoic, nonenoic, decenoic, undecylenic, dodecenoic, tridecenoic, myristolenic, pentadecenoic, palmitolenic, heptadecenoic, oleic, isooleic, petroselic, erucic, brassidic, cetoleic, nervonic, etc. The monobasic organic acids defined above need not be employed as such, but one or more of the hydrogens thereon can be replaced by such diverse radicals as nitro, dialkylamino, alkoxy, alkylmercapto, fluoro, chloro, bromo, iodo, alkyl, phenyl, benzyl, naphthyl, cycloalkyl, etc. Examples of such monobasic organic acids are para-nitrobenzoic, 5-dimethyl-aminepentanoic, methoxyacetic, mercaptoacetic, para-fluorobenzoic, para-chlorobenzoic, para-methylbenzoic, para-phenylbenzoic, benzylacetic, naphthylpropionic, cyclopropylacetic, cyclohexylbenzoic, etc.

To react with the monobasic organic acid defined above to produce the desired ester in accordance with the process defined and claimed herein there must be employed an organic halide selected from the group consisting of primary straight and branched chain alkyl halides having from one to 30 carbon atoms, preferably from one to 22 carbon atoms, secondary straight and branched chain alkyl halides having from one to 30 carbon atoms, preferably from one to 22 carbon atoms, primary cyclic halides having from four to 22 carbon atoms, preferably from four to 12 carbon atoms, secondary cyclic halides having from three to 22 carbon atoms, preferably from three to 12 carbon atoms, primary straight and branched chain olefinic halides having from three to 22 carbon atoms, preferably from six to 22 carbon atoms, secondary straight and branched chain olefinic halides having from three to 22 carbon atoms, preferably from six to 22 carbon atoms, and aromatic halides having from six to 30, preferably from six to 22 carbon atoms. Tertiary alkyl halides will not react with the monobasic organic acids under the conditions defined herein to form the desired ester. Examples of primary halides that can be used are 1-fluoromethane, 1-chloromethane, 1-bromomethane, 1-iodomethane, 1-fluoroethane, 1-chloroethane, 1-bromoethane, 1-iodoethane, 1-fluoropropane, 1-chloropropane, 1-bromopropane, 1-iodopropane, 1-fluorobutane, 1-chlorobutane, 1-bromobutane, 1-iodobutane, 1-fluoropentane, 1-chloropentane, 1-bromopentane, 1-iodopentane, 1-fluorohexane, 1-chlorohexane, 1-bromohexane, 1-iodohexane, 1-fluoroheptane, 1-chloroheptane, 1-bromoheptane, 1-iodoheptane, 1-fluorooctane, 1-chlorooctane, 1-bromooctane, 1-iodooctane, 1-fluorononane, 1-chlorononane, 1-bromononane, 1-iodononane, 1-fluorodecane, 1-chlorodecane, 1-bromodecane, 1-iododecane, 1-fluoroundecane, 1-chloroundecane, 1-bromoundecane, 1-iodoundecane, 1-fluorododecane, 1-chlorododecane, 1-bromododecane, 1-iodododecane, 1-fluorotridecane, 1-chlorotridecane, 1-bromotridecane, 1-idodtridecane, 1-fluorotetradecane, 1-chlorotetradecane, 1-fluoro-2-methylpropane,
1-chloro-2-methylpropane,
1-bromo-2-methylpropane,
1-iodo-2-methylpropane,
1-fluoro-3-methylbutane,
1-chloro-3-methylbutane,
1-bromo-3-methylbutane,
1-idodo-3-methylbutane,
1-bromotetradecane,
1-iodotetradecane,
1-fluoropentadecane,
1-chloropentadecane,
1-bromopentadecane,
1-iodopentadecane,
1-fluorohexadecane,
1-chlorohexadecane,
1-bromohexadecane,
1-iodohexadecane,
1-fluoroheptadecane,
1-chloroheptadecane,
1-bromoheptadecane,
1-iodoheptadecane,
1-fluorooctadecane,
1-chlorooctadecane,
1-bromooctadecane,
1-iodooctadecane,
1-fluorononadecane,
1-chlorononadecane,
1-bromononadecane,
1-iodononadecane,
1-fluoroeicosane,
1-chloroeicosane,
1-bromoeicosane,
1-iodoeicosane
1-fluoroheneicosane,
1-chloroheneicosane,
1-bromoheneicosane,
1-iodoheneicosane,
1-fluorodocosane,
1-chlorodocosane,
1-bromodocosane,
1-iododocosane,
1-fluorotricosane,
1-chlorotricosane,
1-bromotricosane,
1-iodotricosane,
1-fluorotetracosane,
1-chlorotetracosane,
1-bromotetracosane,
1-iodotetracosane,
1-fluoropentacosane,
1-chloropentacosane,
1-bromopentacosane,
1-iodopentacosane,
1-fluorohexacosane,
1-chlorohexacosane,
1-bromohexacosane,
1-iodohexacosane,
1-fluoroheptacosane,
1-chloroheptacosane,
1-bromoheptacosane,
1-iodoheptacosane,
1-fluorooctacosane,
1-chlorooctacosane,
1-bromooctacosane,
1-iodooctacosane,
1-fluorononacosane,
1-chlorononacosane,
1-bromononacosane,
1-iodononacosane,
1-fluorotriacontane,
1-chlorotriacontane,
1-bromotriacontane,
1-iodotriacontane,
1-fluoro-3-methylpentane,
1-chloro-3-methylpentane,
1-bromo-3-methylpentane,
1-iodo-3-methylpentane,
1-fluoro-3,3-dimethylbutane,
1-chloro-3,3-dimethylbutane,
1-bromo-3,3-dimethylbutane,
1-iodo-3,3-dimethylbutane,
1-fluoro-3,3-dimethylpentane,
1-chloro-3,3-dimethylpentane,
1-bromo-3,3-dimethylpentane,
1-iodo-3,3-dimethylpentane,
1-fluoro-3,3-dimethylhexane,
1-chloro-3,3-dimethylhexane,
1-bromo-3,3-dimethylhexane,
1-fluoro-4-methylpentane,
1-chloro-4-methylpentane,
1-bromo-4-methylpentane,
1-iodo-4-methylpentane,
1-fluoro-2-ethylbutane,
1-chloro-2-ethylbutane,
1-bromo-2-ethylbutane,
1-iodo-2-ethylbutane,
1-fluoro-2-ethylhexane,
1-chloro-2-ethylhexane,
1-bromo-2-ethylhexane,
1-iodo-2-ethylhexane,
1-fluoro-2-butyloctane,
1-chloro-2-butyloctane,
1-bromo-2-butyloctane,
1-iodo-2-butyloctane,
1-fluoro-2-hexyldecane, 1-chloro-2-hexyldecane,
1-bromo-2-hexyldecane,
1-iodo-2-hexyldecane,
1-fluoro-2-butylhexane,
1-chloro-2-butylhexane,
1-bromo-2-butylhexane,
1-iodo-2-butylhexane,
1-iodo-3,3-dimethylhexane,
1-fluoro-3,3-dimethylheptane,
1-chloro-3,3-dimethylheptane,
1-bromo-3,3-dimethylheptane,
1-iodo-3,3-dimethylheptane,
1-fluoro-3,3,5,5-tetramethylhexane,
1-chloro-3,3,5,5-tetramethylhexane,
1-bromo-3,3,5,5-tetramethylhexane,
1-iodo-3,3,5,5-tetramethylhexane,
1-fluoro-3-methyl-3-ethylpentane,
1-chloro-3-methyl-3-ethylpentane,
1-bromo-3-methyl-3-ethylpentane,
1-iodo-3-methyl-3-ethylpentane,
1-fluoro-3-methyl-3-ethylhexane,
1-chloro-3-methyl-3-ethylhexane,
1-bromo-3-methyl-3-ethylhexane,
1-iodo-3-methyl-3-ethylhexane,
1-fluoro-3-methyl-3-ethylheptane,
1-chloro-3-methyl-3-ethylheptane,
1-bromo-3-methyl-3-ethylheptane,
1-iodo-3-methyl-3-ethylheptane,
1-fluoro-3-methyl-3-ethylnonane,
1-chloro-3-methyl-3-ethylnonane,
1-bromo-3-methyl-3-ethylnonane,
1-iodo-3-methyl-3-ethylnonane,
1-fluoro-3-methyl-3-ethylundecane,
1-chloro-3-methyl-3-ethylundecane,
1-bromo-3-methyl-3-ethylundecane,
1-iodo-3-methyl-3-ethylundecane,
1-fluoro-2-methylbutane,
1-chloro-2-methylbutane,
1-bromo-2-methylbutane,
1-iodo-2-methylbutane,
1,2-dichloroethane,
1,3-dichloropropane,
1,4-dichlorobutane,
1,5-dichloropentane,
1,6-dichlorohexane,
1,7-dichloroheptane,
1,8-dichlorooctane,
1,9-dichlorononane,
1,10-dichlorodecane,
1,11-dichloroundecane,
1,12-dichlorododecane,
1,13-dichlorotridecane,
1,14-dichlorotetradecane,
1,2-dibromoethane,
1,3-dibromopropane,
1,4-dibromobutane,
1,5-dibromopentane,
1,6-dichlorohexane,
1,7-dibromoheptane,
1,8-dibromooctane,
1,9-dibromononane,
1,10-dibromodecane,
dichloromethane,
1,11-dibromoundecane,
1,12-dibromododecane,
1,13-dibromotridecane,
1,14-dibromotetradecane,
1-chloro-2-bromoethane,
1-chloro-3-bromopropane,
1-chloro-4-bromobutane,
1-chloro-5-bromopentane,
1-chloro-6-bromohexane,
1,5-dichloro-3,3-dimethylpentane,
1-chloro-2,2-dimethylpropane,
1-chloro-2-iodoethane,
benzyl chloride,
benzyl fluoride,
benzyl bromide,
benzyl iodide,
para-xylylene dichloride,
para-xylylene dibromide,
para-xylylene difluoride,
para-xylylene diiodide,
ortho-xylylene dichloride,
ortho-xylylene dibromide,
ortho-xylylene difluoride,
ortho-xylylene diiodide,
meta-xylylene dichloride,
meta-xylylene dibromide,
meta-xylylene difluoride,
meta-xylylene diiodide, etc.

Examples of secondary alkyl halides are
2-fluoropropane,
2-chloropropane,
2-bromopropane,
2-iodopropane,
2-fluorobutane,
2-chlorobutane,
2-bromobutane,
2-iodobutane,
2-fluoropentane,
2-chloropentane,
2-bromopentane,
2-iodopentane,
3-fluoropentane,
3-chloropentane,
3-bromopentane,
3-iodopentane,
2-fluorohexane,
2-chlorohexane,
2-bromohexane,
2-iodohexane,
3-fluorohexane,
3-chlorohexane,
3-bromohexane,
3-iodohexane,
2-fluoroheptane,
2-chloroheptane,
2-bromoheptane,
2-iodoheptane,
3-fluoroheptane,
3-chloroheptane,
3-bromoheptane,
3-iodoheptane,
4-fluoroheptane,
4-chloroheptane,
4-bromoheptane,
4-iodoheptane,
2-fluorooctane,
2-chlorooctane,
2-bromooctane,
2-iodooctane,
3-fluorooctane,
3-chlorooctane,
3-bromooctane,
3-iodooctane,
4-fluorooctane,
4-chlorooctane,
4-bromooctane,
4-iodooctane,
2-fluorononane,
2-chlorononane,
2-bromononane,
2-iodononane,
3-fluorononane,
3-chlorononane,
3-bromononane,
3-iodononane,
4-fluorononane,
4-chlorononane, 4-bromononane,
4-iodononane,
5-fluorononane,
5-chlorononane,
5-bromononane,
5-iodononane,
2-fluorodecane,
2-chlorodecane,
2-bromodecane,
2-iododecane,
3-fluorodecane,
3-chlorodecane,
3-bromodecane,
3-iododecane,
4-fluorodecane,
4-chlorodecane,
4-bromodecane,
4-iododecane,
5-fluorodecane,
5-chlorodecane,
5-bromodecane,
5-iododecane,
2-fluoroundecane,
2-chloroundecane,
2-bromoundecane,
2-iodoundecane,
3-fluoroundecane,
3-chloroundecane,
3-bromoundecane,
3-iodoundecane,
4-fluoroundecane,
4-chloroundecane,
4-bromoundecane,
4-iodoundecane,
5-fluoroundecane,
5-chloroundecane,
5-bromoundecane,
5-iodoundecane,
6-fluoroundecane,
6-chloroundecane,
6-bromoundecane,
6-iodoundecane,
2-fluorododecane,
2-chlorododecane,
2-bromododecane,
2-iodododecane,
3-fluorododecane,
3-chlorododecane,
3-bromododecane,
3-iodododecane,
4-fluorododecane,
4-chlorododecane,
4-bromododecane,
4-iodododecane,
5-fluorododecane,
5-chlorododecane,
5-bromododecane,
5-iodododecane,
6-fluorododecane,
6-chlorododecane,
6-bromododecane,
6-iodododecane,
2-fluorotridecane,
2-chlorotridecane,
2-bromotridecane,
2-iodotridecane,
3-fluorotridecane,
3-chlorotridecane,
3-bromotridecane,
3-iodotridecane,
4-fluorotridecane,
4-chlorotridecane,
4-bromotridecane,
4-iodotridecane,
5-fluorotridecane,
5-chlorotridecane,
5-bromotridecane,
5-iodotridecane,
6-fluorotridecane,
6-chlorotridecane,
6-bromotridecane,
6-iodotridecane,
7-fluorotridecane,
7-chlorotridecane,
7-bromotridecane,
7-iodotridecane,
2-fluorotetradecane,
2-chlorotetradecane,
2-bromotetradecane,
2-iodotetradecane,
3-fluorotetradecane,
3-chlorotetradecane,
3-bromotetradecane,
3-iodotetradecane,
4-fluorotetradecane,
4-chlorotetradecane,
4-bromotetradecane,
4-iodotetradecane,
5-fluorotetradecane,
5-chlorotetradecane,
5-bromotetradecane,
5-iodotetradecane,
6-fluorotetradecane,
6-chlorotetradecane,
6-bromotetradecane,
6-iodotetradecane,
7-fluorotetradecane,
7-chlorotetradecane,
7-bromotetradecane,
7-iodotetradecane,
2-fluoropentadecane,
2-chloropentadecane,
2-bromopentadecane,
2-iodopentadecane,
3-fluoropentadecane,
3-chloropentadecane,
3-bromopentadecane,
3-iodopentadecane,
4-fluoropentadecane,
4-chloropentadecane,
4-bromopentadecane,
4-iodopentadecane,
5-fluoropentadecane,
5-chloropentadecane,
5-bromopentadecane,
5-iodopentadecane,
6-fluoropentadecane,
6-chloropentadecane,
6-bromopentadecane,
6-iodopentadecane,
7-fluoropentadecane,
7-chloropentadecane,
7-bromopentadecane,
7-iodopentadecane,
8-fluoropentadecane,
8-chloropentadecane,
8-bromopentadecane,
8-iodopentadecane,
2-fluorohexadecane,
2-chlorohexadecane,
2-bromohexadecane,
2-iodohexadecane,
3-fluorohexadecane,
3-chlorohexadecane,
3-bromohexadecane,
3-iodohexadecane,
4-fluorohexadecane,
4-chlorohexadecane,
4-bromohexadecane,
4-iodohexadecane, 5-fluorohexadecane,
5-chlorohexadecane,
5-bromohexadecane,
5-iodohexadecane,
6-fluorohexadecane,
6-chlorohexadecane,
5-fluorooctadecane,
5-chlorooctadecane,
5-bromooctadecane,
5-iodooctadecane,
6-fluorooctadecane,
6-chlorooctadecane,
6-bromooctadecane,
6-iodooctadecane,
7-fluorooctadecane,
7-chlorooctadecane,
7-bromooctadecane,
7-iodooctadecane,
8-fluorooctadecane,
8-chlorooctadecane,
8-bromooctadecane,
8-iodooctadecane,
9-fluorooctadecane,
9-chlorooctadecane,
9-bromooctadecane,
9-iodooctadecane,
2-fluorononadecane,
2-chlorononadecane,
2-bromononadecane,
2-iodononadecane,
3-fluorononadecane,
3-chlorononadecane,
3-bromononadecane,
3-iodononadecane,
4-fluorononadecane,
4-chlorononadecane,
4-bromononadecane,
4-iodononadecane,
5-fluorononadecane,
5-chlorononadecane,
5-bromononadecane,
5-iodononadecane,
6-fluorononadecane,
6-chlorononadecane,
6-bromononadecane,
6-iodononadecane,
7-fluorononadecane,
7-chlorononadecane,
7-bromononadecane,
7-iodononadecane,
8-fluorononadecane,
8-chlorononadecane,
8-bromononadecane,
8-iodononadecane,
9-fluorononadecane,
9-chlorononadecane,
9-bromononadecane,
9-iodononadecane,
10-fluorononadecane,
10-chlorononadecane,
6-bromohexadecane,
6-iodohexadecane,
7-fluorohexadecane,
7-chlorohexadecane,
7-bromohexadecane,
7-iodohexadecane,
8-fluorohexadecane,
8-chlorohexadecane,
8-bromohexadecane,
8-iodohexadecane,
2-fluoroheptadecane,
2-chloroheptadecane,
2-bromoheptadecane,
2-iodoheptadecane,
3-fluoroheptadecane,
3-chloroheptadecane,
3-bromoheptadecane,
3-iodoheptadecane,
4-fluoroheptadecane,
4-chloroheptadecane,
4-bromoheptadecane,
4-iodoheptadecane,
5-fluoroheptadecane,
5-chloroheptadecane,
5-bromoheptadecane,
5-iodoheptadecane,
6-fluoroheptadecane,
6-chloroheptadecane,
6-bromoheptadecane,
6-iodoheptadecane,
7-fluoroheptadecane,
7-chloroheptadecane,
7-bromoheptadecane,
7-iodoheptadecane,
8-fluoroheptadecane,
8-chloroheptadecane,
8-bromoheptadecane,
8-iodoheptadecane,
9-fluoroheptadecane,
9-chloroheptadecane,
9-bromoheptadecane,
9-iodoheptadecane,
2-fluorooctadecane,
2-chlorooctadecane,
2-bromooctadecane,
2-iodooctadecane,
3-fluorooctadecane,
3-chlorooctadecane,
3-bromooctadecane,
3-iodooctadecane,
4-fluorooctadecane,
4-chlorooctadecane,
4-bromooctadecane,
4-iodooctadecane,
2-fluorohexacosane,
2-chlorohexacosane,
2-bromohexacosane,
2-iodohexacosane,
13-fluorohexacosane,
13-chlorohexacosane,
13-bromohexacosane,
13-iodohexacosane,
2-fluoroheptacosane,
2-chloroheptacosane,
2-bromoheptacosane,
2-iodoheptacosane,
13-fluoroheptacosane,
13-chloroheptacosane,
13-bromoheptacosane,
13-iodoheptacosane,
2-fluorooctacosane,
2-chlorooctacosane,
2-bromooctacosane,
2-iodooctacosane,
14-fluorooctacosane,
14-chlorooctacosane,
14-bromooctacosane,
14-iodooctacosane,
2-fluorononacosane,
2-chlorononacosane,
2-bromononacosane,
2-iodononacosane,
14-fluorononacosane,
14-chlorononacosane,
14-bromononacosane,
14-iodononacosane,
2-fluorotricontane,
2-chlorotricontane,
2-bromotricontane,
2-iodotricontane, 15-fluorotricontane,
15-chlorotricontane,
15-bromotricontane,
15-iodotricontane,
10-bromononadecane,
10-iodononadecane,
2-fluoroeicosane,
2-chloroeicosane,
10-fluoroeicosane,
10-chloroeicosane,
10-bromoeicosane,
10-iodoeicosane,
2-fluoroheneicosane,
2-chloroheneicosane,
2-chloroheneicosane,
2-chloroheneicosane,
10-fluoroheneicosane,
10-chloroheneicosane,
10-bromoheneicosane,
10-iodoheneicosane,
2-fluorodocosane,
2-chlorodocosane,
2-bromodocosane,
2-iododocosane,
10-fluorodocosane,
10-chlorodocosane,
10-bromodocosane,
10-iododocosane,
2-fluorotricosane,
2-chlorotricosane,
2-bromotricosane,
2-iodotricosane,
10-fluorotricosane,
10-chlorotricosane,
10-bromotricosane,
10-iodotricosane,
2-fluorotetracosane,
2-chlorotetracosane,
2-bromotetracosane,
2-iodotetracosane,
12-fluorotetracosane,
12-chlorotetracosane,
12-bromotetracosane,
12-iodotetracosane,
2-fluoropentacosane,
2-chloropentacosane,
2-bromopentacosane,
2-iodopentacosane,
12-fluoropentacosane,
12-chloropentacosane,
12-bromopentacosane,
12-iodopentacosane,
2-chloro-3-methylbutane,
2-chloro-4-methylpentane,
2-chloro-5-methylhexane,
2-bromo-3-methylbutane,
2-fluoro-3-methylbutane,
2-iodo-3-methylbutane,
2-bromo-4-methylpentane,
2-fluoro-4-methylpentane,
2-iodo-4-methylpentane,
2-bromo-5-methylhexane,
2-fluoro-5-methylhexane,
2-iodo-5-methylhexane, etc.

Examples of primary and secondary cyclic halides are 1-chlorocyclopropane,
1-chloro-1-cyclopropylmethane,
1-bromocyclopropane,
1-bromo-1-cyclopropylmethane,
1-iodocyclopropane,
1-iodo-1-cyclopropylmethane,
1-chlorocyclobutane,
1-chloro-1-cyclobutymethane,
1-bromocyclobutane,
1-bromo-1-cyclobutymethane,
1-iodocyclobutane,
1-iodo-1-cyclobutymethane,
1-chlorocyclopentane,
1-fluorocyclopentane,
1-chloro-1-cyclopentylmethane,
1-bromocyclopentane,
1-bromo-1-cyclopentylmethane,
1-iodocyclopentane,
1-iodo-1-cyclopentylmethane,
1-fluorocyclohexane,
1-chlorocyclohexane,
1-chloro-1-cyclohexylmethane,
1-bromocyclohexane,
1-bromo-1-cyclohexylmethane,
1-iodocyclohexane,
1-iodo-1-cyclohexylmethane,
1-fluorocycloheptane,
1-chlorocycloheptane,
1-bromocycloheptane,
1-iodocycloheptane,
1-fluorocyclooctane,
1-chlorocyclooctane,
1-bromocyclooctane,
1-iodocyclooctane,
1-fluorocyclononane,
1-chlorocyclononane,
1-bromocyclononane,
1-iodocyclononane,
1-chlorocyclodecane,
1-fluorocyclodecane,
1-bromocyclodecane,
1-iodocyclodecane,
1-fluorocycloundecane,
1-chlorocycloundecane,
1-bromocycloundecane,
1-iodocycloundecane,
1-chlorocyclododecane,
1-fluorocyclododecane,
1-bromocyclododecane,
1-iodocyclododecane, etc. Examples of primary olefinic halides are vinyl chloride, vinyl bromide, vinyl iodide, alpha and beta-chloropropylene,
alpha and beta-bromopropylene,
alpha and beta-iodopropylene,
allyl fluoride,
allyl chloride,
allyl bromide,
allyl iodide,
crotyl chloride,
crotyl bromide,
crotyl iodide,
4-chlorobutene-1,
4-fluorobutene-1,
4-bromobutene-1,
e-iodobutene-1,
5-chloropentene-1,
5-fluoropentene-1,
5-bromopentene-1,
5-iodopentene-1,
6-chlorohexene-1,
6-fluorohexene-1,
6-bromohexene-1,
6-iodohexene-1,
7-chloroheptene-1,
7-fluoroheptene-1,
7-bromoheptene-1,
7-iodoheptene-1,
1-chlorobutene-1,
1-bromobutene-1,
1-iodobutene-1,
1-chloropentene-1,
1-bromopentene-1,
1-iodopentene-1,
1-chlorohexene-1, 1-bromohexene-1,
1-iodohexene-1,
1-chlorophentene-1,
1-bromoheptene-1,
1-iodoheptene-1,
1-chlorooctene-1,
1-bromooctene-1,
1-iodooctene-1,
1-chlorononene-1,
1-bromononene-1,
1-iodonone-1,
1-chlorodecene-1,
1-bromodecene-1,
1-iododecene-1,
1-chloroundecene-1,
1-bromoundecene-1,
1-iodoundecene-1,
1-chlorododecene-1,
1-bromododecene-1,
1-iodododecene-1,
1-chlorotridecene-1,
1-bromotridecene-1,
1-iodotridecene-1,
1-chlorotetradecene-1,
1-bromotetradecene-1,
1-iodotetradecene-1,
1-chloropentadecene-1,
1-bromopentadecene-1,
1-iodopentadecene-1,
1-chlorohexadecene-1,
1-bromohexadecene-1,
1-iodohexadecene-1,
1-chloroheptadecene-1,
1-bromoheptadecene-1,
1-iodoheptadecene-1,
1-chlorooctadecene-1,
1-bromooctadecene-1,
1-iodooctadecene-1,
1-chlorononadecene-1,
1-bromononadecene-1,
1-iodononadecene-1,
1-chloroeicosene-1,
1-bromoeicosene-1,
1-iodoeicosene-1,
1-chloroheneicosene-1,
1-bromoheneicosene-1,
1-iodoheneicosene-1,
1-chlorodocosene-1,
1-bomodocosene-1,
1-iododocosene-1,
1-chlorotricosene-1,
1-bromotricosene-1,
1-iodotricosene-1,
1-chlorotetracosene-1,
1-bromotetracosene-1,
1-iodotetracosene-1,
1-chloropentacosene-1,
1-bromopentacosene-1,
1-iodopentacosene-1,
1-chlorohexacosene-1,
1-bromohexacosene-1,
1-iodohexacosene-1,
1-chloroheptacosene-1,
1-bromoheptacosene-1,
1-iodoheptacosene-1,
1-chlorooctacosene-1,
1-bromoctacosene-1,
1-iodooctacosene-1,
1-chlorononacosene-1,
1-bromononacosene-1,
1-iodononacosene-1,
chlorotricontene-1,
1-bromotricontene-1,
1-iodotricontene-1,
1,4-dichlorobutene-2,
1,6-dichlorohexadiene-2,4,
1,4-dibromobutene-2,
1,4-difluorobutene-2,
1,4-diiodobutene-2,
1,6-dibromohexadiene-2,4,
1,6-difluorohexadiene-2,4,
1,6-diiodohexadiene-2,4, etc.

Examples of secondary olefinic halides are 3-chlorobutene-1,
3-fluorobutene-1,
3-bromobutene-1,
3-iodobutene-1,
3-fluoropentene-1,
3-chloropentene-1,
3-bromopentene-1,
3-iodopentene-1,
3-fluorohexene-1,
3-chlorohexene-1,
3-bromohexene-1,
3-iodohexene-1,
3-fluoroheptene-1,
3-chloroheptene-1,
3-bromoheptene-1,
3-iodoheptene-1,
3-fluorooctene-1,
3-chlorooctene-1,
3-bromooctene-1,
3-iodooctene-1,
3-fluorononene-1,
3-chlorononene-1,
3-bromononene-1,
3-iodononene-1,
3-fluorodecene-1,
3-chlorodecene-1,
3-bromodecene-1,
3-iododecene-1,
3-fluoroundecene-1,
3-chloroundecene-1,
3-bromoundecene-1,
3-iodoundecene-1,
3-fluorododecene-1,
3-chlorododecene-1,
3-bromododecene-1,
3-iodododecene-1,
3-fluorotridecene-1,
3-chlorotridecene-1,
3-bromotridecene-1,
3-iodotridecene-1,
3-fluorotetradecene-1,
3-chlorotetradecene-1,
3-bromotetradecene-1,
3-iodotetradecene-1,
3-fluoropentadecene-1,
3-chloropentadecene-1,
3-bromopentadecene-1,
3-iodopentadecene-1,
3-fluorohexadecene-1,
3-chlorohexadecene-1,
3-bromohexadecene-1,
3-iodohexadecene-1,
3-fluoroheptadecene-1,
3-chloroheptadecene-1,
3-bromoheptadecene-1,
3-iodoheptadecene-1,
3-fluorooctadecene-1,
3-chlorooctadecene-1,
3-bromooctadecene-1,
3-iodooctadecene-1,
3-fluorononadecene-1,
3-chlorononadecene-1,
3-bromononadecene-1,
3-iodononadecene-1,
3-fluoroeicosene-1,
3-chloroeicosene-1,
3-bromoeicosene-1,
3-iodoeicosene-1, 3-fluoroheneicosene-1,
3-chloroheneicosene-1,
3-bromoheneicosene-1,
3-iodoheneicosene-1,
3-chlorodocosene-1,
3-chlorotricosene-1,
3-chlorotetracosene-1,
3-chloropentacosene-1,
3-chlorohexacosene-1,
3-chloroheptacosene-1,
3-chlorooctacosene-1,
3-chlorononacosene-1,
3-chlorotricontene-1,
4-chloropentene-1,
5-chlorohexene-1,
6-chloroheptene-1,
7-chlorooctene-1,
8-chlorononene-1,
9-chlorodecene-1,
10-chloroundecene-1,
11-chlorododecene-1,
12-chlorotridecene-1,
13-chlorotetradecene-1,
14-chloropentadecene-1,
15-chlorohexadecene-1,
16-chloroheptadecene-1,
17-chlorooctadecene-1,
18-chlorononadecene-1,
19-chloroeicosene-1,
20-chloroheneicosene-1,
21-chlorodocosene-1,
22-chlorotricosene-1,
23-chlorotetracosene-1,
24-chloropentacosene-1,
25-chlorohexacosene-1,
26-chloroheptacosene-1,
27-chlorooctacosene-1,
28-chlorononacosene-1,
29-chlorotricontene-1,
1-chloro-2-cyclohexene,
2-chloro-2-cyclohexene,
1-chloro-2,4-cyclohexadiene, etc.

Examples of aromatic halides are fluorobenzene, chlorobenzene, bromobenzene, iodobenzene, fluorotoluene, chlorotoluene, bromotoluene, iodotoluene, fluoroxylene, chloroxylene, bromoxylene, iodoxylene, fluoronaphthalene, chloronaphthalene, bromonaphthalene, iodonaphthalene, 4-chloro-2-nitroanisole, para-dichlorobenzene, para-dibromobenzene, para-difluorobenzene, para-diiodobenzene, meta-dichlorobenzene, meta-dibromobenzene, meta-difluorobenzene, meta-diiodobenzene, ortho-dichlorobenzene, ortho-dibromobenzene, ortho-difluorobenzene, ortho-diiodobenzene, etc. The organic halides defined above need not be employed as such, but one or more of the hydrogens thereon can be replaced by such diverse radicals as nitro, dialkylamino, alkoxy, alkylmercapto, alkyl, phenyl, benzyl, naphthyl, cycloalkyl, xylylenyl, etc. Examples of such organic halides are 1-chloro-5-nitropentane, 1-dimethylamine-4-bromobenzene, 1-chloro-6-methoxyhexane, 1-bromo-8-mercaptooctane, 1-chloro-4-methylbenzene, 4-chloro-2-nitroanisole, 1-chloro-2-benzylethane, 1-chloro-3-phenylpropane, 1-bromo-4-naphthylbutane, 1-bromo-3-cyclopropylpropane, 1-chloro-5-cyclohexylpentane, 1,4-di-(omega-chloroethyl) benzene, etc. Of these organic halides I prefer to employ the alkyl halides, particularly the primary alkyl halides. Of the alkyl halides I prefer the alkyl chlorides and the alkyl bromides. In the desired reaction while I prefer to employ the monobasic organic acid and the organic halide in approximately stoichiometric amounts, the molar proportions thereof can vary from about 10:1 to about 1:10.

In carrying out the reaction the reactants defined above are merely brought together in any convenient manner. The temperature must be at least about 180° C., preferably at least about 220° C., in order to initiate and drive the reaction however, the temperature must be maintained below about 400° C., preferably below about 350° C., but more preferably below 300° C. when secondary organic halides defined herein are employed, in order to avoid decomposition of the reactants or the ester produced. Pressure is not critical and can be from about 0 to about 3000 pounds per square inch gauge, preferably about 0 to about 1200 pounds per square inch gauge. Reaction time can be from about one minute to about 40 hours, preferably from about 15 minutes to about three hours.

During the course of the reaction an ester and a hydrogen halide are produced, and since the hydrogen halide is in vapor form it is easily removed from the reaction zone and can be recovered. The reaction mixture then comprises essentially the desired ester and unreacted charge. The reaction mixture can then be distilled at a temperature of about 20° to about 380° C. and at a pressure from about one mm. of mercury to about atmospheric pressure to recover separately therefrom the unreacted charge and the desired ester.

In order to facilitate the reaction defined above, however, I prefer to conduct the same in the presence of a catalyst compound having the structure of the monobasic organic acid defined above but wherein an acid hydrogen thereof is replaced by an element selected from the group consisting of lithium, magnesium, calcium, scandium, titanium (those having a valence of plus 2, plus 3 and plus 4), vanadium (those having a valence of plus 2, plus 3 and plus 4), chromium (those having a valence of plus 2 and plus 3), managanese (those having a valence of plus 2, plus 3 and plus 4), iron (ferrous and ferric), cobalt (cobaltous and cobaltic), nickel (nichelous and nickelic), copper (cuprous and cupric), zinc, boron, aluminum, silicon, phosphorous, sulfur, zirconium (those having a valence of plus 2, plus 3 and plus 4), tin (stannous and stannic), antimony (those having a valence of plus 3 and plus 5), and bismuth (those having a valence of plus 3 and plus 5). Of these magnesium, calcium, aluminum and lithium are preferred. The elements sodium, potassium, strontium or barium will not, under the conditions employed herein, replace an hydrogen atom of said acid to form a catalyst for the process defined herein. By "catalyst" I mean to include substances which by virtue of their presence in a chemical reaction affects the rate thereof and which will be recovered practically unchanged at the end of the reaction. The catalyst can be added to the reaction mixture or it can be formed in situ. The amount of catalyst employed can be, for example, from about one to about 150 mil percent, preferably from about 50 to about 100 mol percent relative to the organic halide employed. At the end of the reaction, when the reaction mixture is separated into its individual components, as defined hereinabove, the catalyst is left behind after the unreacted charge and ester is removed therefrom.

The use of the catalyst defined above not only affects the course of the defined reaction, in that it increases the rate thereof, but does not, advantageously, react with the hydrogen halide which is a by-product of the reaction defined herein. In this process under the reaction conditions employed the hydrogen halide is in the gaseous state and is easily removed therefrom so that it does not combine with the catalyst. Because of this the hydrogen halide can be recovered and used, if desired, and the catalyst, too, can be recovered for reuse in the esterification reaction defined herein. The use of the catalyst defined herein is therefore advantageous over the use of a compound, such as a tertiary amine, ammonia, sodium hydroxide, potassium hydroxide, etc., to facilitate the esterification reaction, since the latter compounds will form a stable compound with the hydrogen halide evolved. In this way neither the hydrogen halide nor the defined compound used to facilitate the esterification reaction will be immediately available for further use. In addition the stable compound produced will present an additional purification problem in obtaining a pure ester.

The process described and claimed herein can further be illustrated by the following. In Table I below are data obtained from experiments wherein an organic halide and an organic acid were added to a 75 millimeter test tube and the contents heated at the defined temperatures and at atmospheric pressure over a selected period of time. As a result thereof an ester was obtained and the vaporous hydrogen halide evolved was permitted to escape from the reaction zone. The amount of ester in the reaction mixture was determined by gas chromatography.

chloride was added to the reaction mixture and the resulting mixture was heated at the defined temperature and atmospheric pressure for the defined period of time. Experiment 31 was conducted in the same manner as Experiments 27 and 28, except that additional alcohol was present so that during the reaction with sebacic acid it would azeotrope with any water present and be removed from the reaction zone. At the end of the reaction period the mixture in the reaction zone in each of Experiments 21 to 33, inclusive, was analyzed by gas chromatography and no ester was found.

TABLE II

| Experiment Number | Organic Halide (mol) | Organic acid (mol) | Temperature, °C. | Reaction time, minutes | Ester yield, mol percent [1] |
|---|---|---|---|---|---|
| 21 | Allyl chloride (0.026) | Ortho-phthalic (0.034) | 170–190 | 150 | None. |
| 22 | Octyl bromide (0.029) | Succinic (0.085) | 210 | 60 | Do. |
| 23 | p-Xylylene dichloride (0.171) | Ortho-phthalic (0.061) | 183–263 | 60 | Do. |
| 24 | p-Xylylene dichloride (0.114) | Iso-phthalic (0.061) | 246–259 | 10 | Do. |
| 25 | n-Dodecyl chloride (0.097) | do | 263–268 | 15 | Do. |
| 26 | Benzyl chloride (0.257) | Iso-phthalic (0.03) | 179–182 | 60 | Do. |
| 27 | Benzyl chloride (0.10) | Phthalic anhydride (0.10) / n-Octyl alcohol (0.10) | 180–195 / 180–195 | 30 / 30 | Do. / Do. |
| 28 | do | Phthalic anhydride (0.10) / n-Octyl alcohol (0.10) | 180–198 / 220 | 25 / 15 | Do. |
| 29 | Benzyl chloride (0.86) | Ortho-phthalic (0.43) | 246 | 90 | Do. |
| 30 | Benzyl chloride (1.72) | Isophthalic (.086) | 234 | 20 | Do. |
| 31 | n-Dodecyl chloride (0.032) | Sebacic (0.049) / n-Butanol (0.16) | 355–378 | 30 | Do. |
| 32 | n-Dodecyl chloride (0.097) | Sebacic (0.049) | 250–268 | 30 | Do. |
| 33 | n-Octyl chloride (0.057) | Azealic (0.135) | 192 | 10 | Do. |

[1] Based on organic halide charged.

In Table III below are data obtained as a result of the reaction of an organic halide with an organic acid in the

TABLE I

| Experiment Number | Organic halide (mol) | Organic acid (mol) | Temperature, °C. | Reaction time, minutes | Ester yield, mol percent[1] | |
|---|---|---|---|---|---|---|
| 1 | n-Octyl chloride (0.067) | n-Perlargonic (0.0063) | 145 | 780 | | |
| 2 | n-Octyl chloride (0.018) | n-Pelargonic (0.057) | 221 | 120 | 3.1 | |
| 3 | n-Octyl chloride (0.060) | n-Pelargonic (0.001) | 195 | 420 | 0.5 | |
| 4 | n-Octyl chloride (0.0018) | 2,2-dimethyl heptanoic (0.057) | 216 | 30 | 1.5 | |
| 5 | n-Octyl bromide (0.018) | n-Pelargonic (0.057) | 225 | 40 | 10.0 | |
| 6 | n-Propyl iodide (0.021) | n-Pelargonic (0.086) | 193 | 240 | 4.6 | |
| 7 | n-Hexyl fluoride (0.0115) | n-Pelargonic (0.110) | 228–240 | 30 | 4.7 | |
| 8 | Neo-octyl chloride (10 weight percent 3-ethyl-3-methyl pentyl chloride-1 and 90 weight percent 3,3-dimethyl hexylchloride-1.) (0.012). | n-Pelargonic | 235 | 120 | 11.3 | |
| 9 | Neo-octyl chloride (Same composition as in Experiment 8) (0.012). | 2,2-dimethyl heptanoic (0.057) | 218 | 60 | 1.0 | |
| 10 | Neo-octyl chloride (Same composition as in Experiment 8) (0.018.). | do | 223 | 120 | 2.0 | |
| 11 | Secondary normal octyl chloride (0.018) | n-Pelargonic (0.086) | 228 | 30 | 7.3 | |
| 12 | Secondary chlorocyclohexane (0.016) | n-Pelargonic (0.057) | 210 | 60 | 3.1 | |
| 13 | Benzyl chloride (0.087) | n-Pelargonic (0.017) | 180 | 30 | 7.5 | |
| 14 | Ethyl bromide (0.530) | Oleic (1.00) | 228 | 180 | 28.0 | |
| 15 | Octadecyl bromide (0.502) | Acetic (1.05) | 245 | 240 | 8.3 | |
| 16 | Benzyl chloride (0.017) | Benzoic (0.084) | 230–248 | 15 | 74 | |
| 17 | 4-chloro-2-nitroanisole (0.011) | Laurie (0.050) | 280–292 | 30 | 37.4 | |
| | | | | | Mono-ester | Di-ester |
| 18 | Dichloro ethane (0.530) | Propionic (2.01) | 280 | 210 | 8.0 | 4. |
| 19 | p-Xylylene dichloride (0.023) | 2-ethyl-butyric (0.016) | 205–214 | 180 | 42.5 | 10. |
| 20 | Trans 1,4-dichlorobutene-2 (0.088) | do | 182–185 | 210 | 5.9 | 3. |

[1] Based on organic halide charged.

In Table II below there are data showing that an organic halide will not react with an organic dibasic acid under the reaction conditions defined herein to produce an ester. In Experiment 21 the reactants were heated for the defined length of time in a tantulum autoclave at a pressure of 300–345 pounds per square inch gauge. In Experiments 23, 24, 25, 26, 29, 30, 32 and 33 the reactants were added to a 75 millimeter test tube and the contents were heated at the defined temperature and atmospheric pressure for the defined length of time. In Experiments 27 and 28 the phthalic anhydride and n-octyl alcohol were heated at a temperature of 140° C. and 280° C., respectively, and atmospheric pressure for 15 minutes in order to obtain the half acid of the phthalic anhydride for reaction with the organic halide. After cooling to 140° C. benzyl presence of a catalyst in accordance with a preferred embodiment of my invention. In each of the experiments reported therein the organic acid and the metal compound were added to a 75 milliliter test tube and the contents thereof were heated for the defined length of time and temperature at atmospheric pressure. As a result of such heating a portion of the acid reacted with the metal compound, as evidenced by the evolvement from the reaction zone of a vaporous hydrogen halide, to form a catalyst. The mixture was then cooled to room temperature, the organic halide was then added thereto and the mixture heated for the defined length of time and temperature and atmospheric pressure. A hydrogen halide was evolved and an ester was analyzed by gas chromatography for the ester.

TABLE III

| Experiment No. | Metal compound (mol) | Organic acid (mol) | Temperature, °C. | Reaction Time, minutes | Organic halide (mol) | Temperature, °C. | Reaction time, minutes | Ester yield, mol percent [1] | |
|---|---|---|---|---|---|---|---|---|---|
| 34 | Magnesium chloride (0.021). | Lauric (0.035) | 240 | 15 | Monobromobenzene (0.013). | 208 | 15 | 19.1 | |
| | | | | | | | | Monoester | Diester |
| 35 | do | 2-ethyl-butryic (0.086). | 185 | 15 | p-Dichlorobenzene (0.014). | 180 | 15 | 2.2 | 0.5 |
| 36 | Lithium chloride (0.035) | Lauric (0.035) | 308 | 15 | n-Octyl bromide (0.010). | 285 | 15 | 70.4 | |
| 37 | Calcium chloride (0.018) | Pelargonic (0.044) | 248 | 15 | n-Octyl chloride (0.014) | 220 | 15 | 18.3 | |
| 38 | Lanthium chloride (0.008). | Lauric (0.035) | 302 | 15 | do | 258 | 30 | 50.0 | |
| 39 | Cesium chloride (0.008) | Pelargonic (0.044) | 258 | 15 | do | 218 | 30 | 81.9 | |
| 40 | Titanium tetrachloride (0.008). | do | 260 | 15 | do | 26 | 15 | 14.5 | |
| 41 | Zirconium tetrachloride (0.0064). | Pelargonic (0.095) | 258 | 15 | do | 239 | 15 | 29.6 | |
| 42 | Vanadium tetrachloride (0.0093). | do | 111 | 15 | n-Octyl bromide (0.010) | 198 | 15 | 29.8 | |
| 43 | Chromium chloride (0.0083). | do | 259 | 15 | n-Octyl chloride (0.13) | 240 | 15 | 41.4 | |
| 44 | Manganese chloride (0.022). | Lauric (0.035) | 308 | 15 | n-Octyl bromide (0.010) | 258 | 15 | 17.2 | |
| 45 | Ferric chloride (0.0086) | Pelargonic (0.095) | 252 | 15 | n-Octyl chloride (0.014) | 235 | 15 | 18.0 | |
| 46 | Cobaltous chloride (0.012). | Lauric (0.035) | 290 | 15 | n-Octyl bromide (0.010) | 240 | 15 | 31.1 | |
| 47 | Nickelous chloride | do | 295 | 15 | do | 238 | 15 | 24.2 | |
| 48 | Cuprous chloride (0.025) | do | 302 | 15 | do | 258 | 15 | 11.8 | |
| 49 | Zinc dichloride (0.014) | Pelargonic (0.044) | 263 | 15 | n-Octyl chloride (0.014) | 220 | 15 | 20.3 | |
| 50 | Stannic tetrachloride (0.006). | Pelargonic (0.095) | 260 | 15 | do | 245 | 30 | 9.4 | |
| 51 | Antimony chloride (0.0083). | do | 263 | 15 | do | 247 | 15 | 11.7 | |
| 52 | Bismuth chloride (0.0082) | Lauric (0.035) | 303 | 15 | n-Octyl bromide (0.10) | 260 | 30 | 39.3 | |
| 53 | Trimethyl silicon monochloride (0.018). | Pelargonic (0.044) | 240 | 15 | n-Octyl chloride (0.014). | 215 | 15 | 3.2 | |
| 54 | Phosphorous trichloride (0.016). | do | 250 | 15 | do | 218 | 15 | 11.3 | |
| 55 | Sulfur dichloride (0.016) | do | 250 | 15 | do | 212 | 30 | 4.7 | |
| 56 | Boric acid (0.32) | Stearic (1.25) | 305-330 | [2] | n-Dodecyl chloride (0.500). | 305-330 | [2] | 41.3 | |
| 57 | Magnesium oxide (0.049) | Pelargonic (0.127) | 220 | 15 | n-Octyl chloride | 223 | 30 | 46.6 | |
| 58 | Magnesium metal (0.041) | Pelargonic (0.045) | 260 | 15 | do | 211 | 15 | 22.9 | |

[1] Based on organic halide charged.
[2] 28 hours.

Table IV below summarized additional data obtained under the preferred embodiment of my invention. In each of the experiments reported therein the organic acid and metal compound catalyst were added to a three-neck flask and the contents thereof heated at atmospheric pressure over a designated period of time to the defined temperature. When this temperature was reached the organic halide was added incrementally thereto at said temperature over the reaction period. This was done because n-octyl chloride boils at 180° C. and n-dodecyl chloride at 260° C. at atmospheric pressure. To have added the organic halide to the reaction zone initially with the organic acid and the metal catalyst would otherwise have resulted in a loss of the alkyl halides from the reaction zone. Hydrogen halide was evolved from the reaction zone during the reaction. In Experiments 47 and 48 the reaction product was analyzed by gas chromatography. In Experiments 42 to 46, inclusive, and 49 the reaction mixture was hydrolyzed with an excess of water at a temperature of 100° to 112° C. over a period of four to 20 hours. The alcohol obtained was analyzed by gas chromatography. The ester produced was determined by the amount of alcohol so found.

In Table V below all of the reactants were placed in a 75 milliliter test tube and the contents thereof heated for the defined length of time and temperature and atmospheric pressure. As a result of this, hydrogen chloride was evolved from the reaction zone. The ester in the reaction product was analyzed by gas chromatography.

TABLE V

Experiment Number 66:
   Metal compound
     (mol) _____Magnesium chloride (0.021).
   Organic acid (mol) _____Benzoic (0.016).
   Organic halide
     (mol) _____Benzyl monochloride (0.118).
   Temperature ° C. _____ 179.
   Reaction time, minutes _____ 15.
   Ester yield mol percent
     based on organic halide charged _____ 0.5.

Sodium, potassium, strontium and barium will not react with the organic monobasic acids employed herein and therefore will not form a compound therewith that will catalyze the desired esterification reaction defined and claimed herein. This is shown below in Table VI.

TABLE IV

| Experiment Number | Metal compound (Mol) | Organic acid (mol) | Temperature, °C. | Organic halide (mol) | Reaction time, minutes | Ester yield, mol percent [1] |
|---|---|---|---|---|---|---|
| 59 | Magnesium stearate (0.101) | Stearic (1.07) | 300-308 | n-Coctyl chloride (1.06) | 300 | 76.4 |
| 60 | do | Lauric (2.11) | 300-316 | n-Octyl chloride (0.835) | 300 | 43.4 |
| 61 | Magnesium stearate (0.026) | Stearic (3.14) | 301-337 | n-Dodecyl chloride (1.08) | 480 | 50.2 |
| 62 | Aluminum stearate (0.273) | Stearic (1.52) | 255-271 | n-Octyl chloride (0.431) | 120 | 34.0 |
| 63 | Magnesium octanoate (0.200) | Octanoic (0.200) | 249-255 | n-Octyl chloride (0.202) | 75 | 99.5 |
| 64 | Magnesium pelargonate (0.252) | Pelargonic (0.252) | 248-280 | n-Octyl chloride (0.124) | 210 | 96.8 |
| 65 | Magnesium stearate (0.028) | Stearic (0.505) | 285-315 | n-Octyl bromide (0.250) | 105 | 42.0 |

[1] Based on organic halide charged.

The metal chloride and the organic acid were placed in a 75 milliliter test tube and the contents thereof were heated at atmospheric pressure and at the defined temperature for a selected amount of time, but no hydrogen chloride, which would evidence a reaction between the compounds, was noted.

TABLE VI

| Experiment Number | Metal compound (mol) | Organic acid (mol) | Temperature, °C. | Reaction time, minutes | HCL produced |
|---|---|---|---|---|---|
| 67 | Sodium chloride (0.018) | Behenic (0.02) | 395–410 | 30 | None. |
| 68 | Potassium chloride (0.021) | Behenic (0.02) | 370–410 | 30 | Do. |
| 69 | Strontium chloride (0.009) | Behenic (0.021) | 392–398 | 30 | Do. |
| 70 | Barium chloride (0.009) | Behenic (0.024) | 380–400 | 30 | Do. |

Obviously many modifications and variations of the invention, as hereinabove set forth, can be made without departing from the spirit and scope thereof, and therefore only such limitations should be imposed as are indicated in the appended claims.

I claim:

1. A process for preparing an ester which comprises reacting a monobasic aliphatic carboxylic acid having from two to 30 carbon atoms with an organic halide selected from the group consisting of a primary straight and branched chain alkyl halide having from one to 30 carbon atoms, a secondary straight and branched chain alkyl halide having from one to 30 carbon atoms, a primary straight and branched chain olefinic hydrocarbon halide having from three to 22 carbon atoms, wherein the halide thereof is at least one carbon removed from a double bond thereof, and a secondary straight and branched chain olefinic hydrocarbon halide having from three to 22 carbon atoms, wherein the halide thereof is at least one carbon removed from a double bond thereof, said monobasic carboxylic acid and said organic halide being the sole reactants for formation of said ester.

2. The process of claim 1 wherein the monobasic carboxylic acid is a monobasic aliphatic carboxylic acid having from two to 22 carbon atoms and the organic halide is a primary straight and branched chain alkyl halide having from one to 22 carbon atoms.

3. The process of claim 1 wherein the monobasic carboxylic acid is a monobasic aliphatic carboxylic acid having from two to 22 carbon atoms and the organic halide is a secondary straight and branched chain alkyl halide having from one to 22 carbon atoms.

4. The process of claim 1 wherein the monobasic carboxylic acid is a monobasic aliphatic carboxylic acid having from two to 22 carbon atoms and the organic halide is a primary straight and branched chain olefinic hydrocarbon halide having from six to 22 carbon atoms wherein the halide portion thereof is at least one carbon removed from a double bond thereof.

5. The process of claim wherein the monobasic carboxylic acid is a monobasic aliphatic carboxylic acid having from two to 22 carbon atoms and the organic halide is a secondary straight and branched chain olefinic hydrocarbon halide having from six to 22 carbon atoms wherein the halide portion thereof is at least one carbon removed from a double bond thereof.

6. The process of claim 1 wherein the monobasic carboxylic acid is a monobasic aliphatic carboxylic acid having from two to 22 carbon atoms, the organic halide is a primary straight and branched chain alkyl halide having one to 22 carbon atoms, and the reaction is carried out at a temperature of at least 180° C. but no higher than about 400° C.

7. The process of claim 1 wherein the monobasic carboxylic acid is a monobasic aliphatic carboxylic acid having from two to 22 carbon atoms, the organic halide is a secondary straight and branched chain alkyl halide having from one to 22 carbon atoms, and the reaction is carried out at a temperature of at least 180° C. but no higher than about 400° C.

8. The process of claim 1 wherein the monobasic carboxylic acid is a monobasic aliphatic carboxylic acid having from two to 22 carbon atoms, the organic halide is a primary straight and branched chain olefinic hydrocarbon halide having from six to 22 carbon atoms wherein the halide portion thereof is at least one carbon removed from a double bond thereof, and the reaction is carried out at a temperature of at least 180° C. but no higher than about 400° C.

9. The process of claim 1 wherein the monobasic carboxylic acid is a monobasic carboxylic acid having from two to 22 carbon atoms, the organic halide is a secondary straight and branched chain olefinic hydrocarbon halide having from six to 22 carbon atoms wherein the halide portion thereof is at least one carbon removed from a double bond thereof, and the reaction is carried out at a temperautre of at least 180° C. but no higher than about 400° C.

10. The process of claim 1 wherein the reaction is carried out in the presence of catalytic amounts of a compound composed of said carboxylic acid wherein an acid hydrogen thereof is replaced by an element selected from the group consisting of lithium, magnesium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth.

11. The process of claim 1 wherein the monobasic acid is a monobasic aliphatic carboxylic acid having from two to 22 carbon atoms, the organic halide is a primary straight and branched chain alkyl halide having from one to 22 carbon atoms and the reaction is carried out in the presence of catalytic amounts of a compound composed of said carboxylic acid wherein an acid hydrogen thereof is replaced by an element selected from the group consisting of lithium, magnesium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth.

12. The process of claim 1 wherein the monobasic acid is a monobasic aliphatic carboxylic acid having from two to 22 carbon atoms, the organic halide is a secondary straight and branched chain alkyl halide having from one to 22 carbon atoms and the reaction is carried out in the presence of catalytic amounts of a compound composed of said carboxylic acid wherein an acid hydrogen thereof is replaced by an element selected from the group consisting of lithium, magnesium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth.

13. The process of claim 1 wherein the monobasic acid is a monobasic aliphatic carboxylic acid having from two to 22 carbon atoms, the organic halide is a primary straight and branched chain olefinic hydrocarbon halide having from six to 22 carbon atoms wherein the halide portion thereof is at least one carbon removed from a double bond thereof and the reaction is carried out in the presence of catalytic amounts of a compound composed of said carboxylic acid wherein an acid hydrogen thereof is replaced by an element selected from the group consisting of lithium, magnesium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth.

14. The process of claim 1 wherein the monobasic acid is a monobasic aliphatic carboxylic acid having from two to 22 carbon atoms, the organic halide is a secondary straight and branched chain olefinic hydrocarbon halide having from six to 22 carbon atoms wherein the halide portion thereof is at least one carbon removed from a double bond thereof and the reaction is carried out in the presence of catalytic amounts of a compound composed of said carboxylic acid wherein an acid hydrogen thereof is replaced by an element selected from the group consisting of lithium, magnesium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth.

15. The process of claim 1 wherein the monobasic acid is a monobasic aliphatic carboxylic acid having from two to 22 carbon atoms, the organic halide is a primary straight and branched chain alkyl halide having from one to 22 carbon atoms, the reaction is carried out in the presence of catalytic amounts of a compound composed of said carboxylic acid wherein an acid hydrogen thereof is replaced by an element selected from the group consisting of lithium, magnesium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth, and the reaction is carried out at a temperature of at least 180° C. but no higher than about 400° C.

16. The process of claim 1 wherein the monobasic acid is a monobasic aliphatic carboxylic acid having from two to 22 carbon atoms, the organic halide is a secondary straight and branched chain alkyl halide having from one to 22 carbon atoms, the reaction is carried out in the presence of catalytic amounts of a compound composed of said carboxylic acid wherein an acid hydrogen thereof is replaced by an element selected from the group consisting of lithium, magnesium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth, and the reaction is carried out at a temperature of at least 180° C. but no higher than about 400° C.

17. The process of claim 1 wherein the monobasic acid is a monobasic aliphatic carboxylic acid having from two to 22 carbon atoms, the organic halide is a primary straight and branched chain olefinic hydrocarbon halide having from six to 22 carbon atoms wherein the halide portion thereof is at least one carbon removed from a double bond thereof, the reaction is carried out in the presence of catalytic amounts of a compound composed of said carboxylic acid wherein an acid hydrogen thereof is replaced by an element selected from the group consisting of lithium, magnsium, calcium, lanthium, cesium, titanium, vanadium, chromium, manganese, iron, cobalt, nickel, copper, zinc, boron, aluminum, silicon, phosphorus, sulfur, zirconium, tin, antimony and bismuth, and the reaction is carried out at a temperature of at least 180° C. but no higher than about 400° C.

18. The process of claim 1 wherein the monobasic acid is a monobasic aliphatic carboxylic acid having from two to 22 carbon atoms, the organic halide is a secondary straight and branched chain olefinic hydrocarbon halide having from six to 22 carbon atoms wherein the halide portion thereof is at least one carbon removed from a double bond thereof, the reaction is carried out in the presence of catalytic amounts of a compound composed of said carboxylic acid wherein an acid hydrogen thereof is replaced by an element selected from the group consisting of lithium, magnesium, calcium, lanthium cesium, titanium, vanadium, chromium, manganese, iron, cobalt, nickel, copper, zinc, boron, aluminum, silicon, phosphorus, sulfur, zirconium, tin, antimony and bismuth, and the reaction is carried out at a temperature of at least 180° C. but no higher than about 400° C.

19. The process of claim 1 wherein the reaction is carried out in the presence of catalytic amounts of a compound of said carboxylic acid wherein an acid hydrogen thereof is replaced with magnesium.

20. The process of claim 1 wherein the reaction is carried out in the presence of catalytic amounts of a compound composed of said carboxylic acid wherein an acid hydrogen thereof is replaced with chromium.

21. The process of claim 1 wherein the reaction is carried out in the presence of catalytic amounts of a compound composed of said carboxylic acid wherein an acid hydrogen thereof is replaced with iron.

22. The process of claim 1 wherein the reaction is carried out in the presence of catalytic amounts of a compound composed of said carboxylic acid wherein an acid hydrogen thereof is replaced with aluminum.

23. The process of claim 1 wherein the reaction is carried out in the presence of catalytic amounts of a compound composed of said carboxylic acid wherein an acid hydrogen thereof is replaced with lithium.

References Cited

UNITED STATES PATENTS

| | | | |
|---|---|---|---|
| 3,278,569 | 10/1966 | Simon et al. | 260—410.5 |
| 3,148,200 | 9/1964 | Mills et al. | 260—475 |
| 3,148,207 | 9/1964 | Weinkauff et al. | 260—485 |
| 3,221,045 | 11/1965 | McKeon et al. | 260—497 |
| 3,420,803 | 1/1969 | Price et al. | 260—75 |

FOREIGN PATENTS 169,040    7/1934    Switzerland.

OTHER REFERENCES

Groggins: Unit Processes in Organic Synthesis 1935, pp. 607–9.

Wertheim: Organic Chemistry (1951), pp. 93, 95, 484 and 491.

LORRAINE A. WEINBERGER, Primary Examiner

R. S. WEISSBERG, Assistant Examiner

U.S. Cl. X.R.

260—295, 410.6, 410.9, 468, 469, 470, 471, 472, 473, 476, 478, 479, 481, 482, 484, 486, 487, 493

PO-1050
(5/69)

UNITED STATES PATENT OFFICE
CERTIFICATE OF CORRECTION

Patent No. 3,510,500      Dated May 5, 1970

Inventor(s) William L. Walsh

It is certified that error appears in the above-identified patent and that said Letters Patent are hereby corrected as shown below:

Column 11, after "2-chloroeicosane" at line 8, please insert "2-bromoeicosane, 2-iodoeicosane,".

TABLE I, column 6 of Experiment No. 20, under the heading "Diester", "4." and "3." should be changed to "4.2" and "3.2", respectively.

TABLE III, column 6 of Experiment No. 40, temperatures °C. should be changed from "26" to "226".

TABLE III, column 5 of Experiment No. 43, please change "n-Octyl chloride (0.13)" to "n-Octyl chloride (0.013)".

TABLE III, column 2 of Experiment No. 47, after "Nickelous chloride", please insert "(0.012)".

Column 24, line 3 of claim 19, after "pound", please insert "composed".

SIGNED AND
SEALED
SEP 15 1970

(SEAL)
Attest:

Edward M. Fletcher, Jr.
Attesting Officer

WILLIAM E. SCHUYLER, JR.
Commissioner of Patents